(12) United States Patent
Lee et al.

(10) Patent No.: US 7,613,471 B2
(45) Date of Patent: Nov. 3, 2009

(54) METHOD OF PROVIDING SMS CALLBACK

(75) Inventors: Eng Sia Lee, Penang (MY); Heng Ho Peter Yeow, Selangor (MY); Jin Feei Loh, Petaling Jaya (MY)

(73) Assignee: Redtone Technology Sdn Bhd, Puchong (MY)

( * ) Notice: Subject to any disclaimer, the term of this patent is extended or adjusted under 35 U.S.C. 154(b) by 230 days.

(21) Appl. No.: 10/576,220

(22) PCT Filed: Oct. 13, 2004

(86) PCT No.: PCT/SG2004/000335
§ 371 (c)(1),
(2), (4) Date: Apr. 14, 2006

(87) PCT Pub. No.: WO2005/036903

PCT Pub. Date: Apr. 21, 2005

(65) Prior Publication Data
US 2007/0072630 A1    Mar. 29, 2007

(30) Foreign Application Priority Data
Oct. 14, 2003    (MY) ............................... PI20033905

(51) Int. Cl.
*H04W 4/00*    (2006.01)
(52) U.S. Cl. ..................................... 455/466; 370/279

(58) Field of Classification Search .................. 455/466, 455/95
See application file for complete search history.

(56) References Cited

U.S. PATENT DOCUMENTS

| | | | | |
|---|---|---|---|---|
| 5,631,947 A * | 5/1997 | Wittstein et al. | ....... | 379/114.17 |
| 2003/0185203 A1* | 10/2003 | Chow et al. | .................. | 370/352 |
| 2004/0137921 A1* | 7/2004 | Valloppillil et al. | ......... | 455/466 |
| 2004/0203610 A1* | 10/2004 | Deeds | ..................... | 455/412.1 |
| 2005/0099997 A1* | 5/2005 | Kuwabara et al. | ........... | 370/352 |

FOREIGN PATENT DOCUMENTS

| EP | 1 103 150 B1 | 12/1998 |
|---|---|---|
| GB | 2 342 536 A | 4/2000 |
| WO | WO 02/05533 A1 | 1/2002 |

* cited by examiner

*Primary Examiner*—Rafael Pérez-Gutiérrez
*Assistant Examiner*—Marcos Batista
(74) *Attorney, Agent, or Firm*—Boyle Frederickson, S.C.

(57) ABSTRACT

A method of connecting two or more phone lines in a cross-country connection through a rented device. The device may be a mobile phone or a SIM card. An SMS message is sent from the rented device to a service provider bearing the identification of the phone lines to be connected. The SMS is received by a gateway of the service provider, and the gateway subsequently places calls to the phone lines in the SMS and connects the phone lines.

39 Claims, 2 Drawing Sheets

METHOD OF PROVIDING SMS CALLBACK

FIELD OF THE INVENTION

The present invention relates to a method of renting mobile phones to provide SMS callback.

BACKGROUND OF INVENTION

Currently, it is an international phenomenon that an owner of a mobile phone carries with him his mobile phone when he travels. This can be ascribed mainly to convenience, and partly to the availability of roaming service provided by phone service providers.

When a person makes a call through his own mobile phone in, for example, a foreign country, he uses the roaming service provided by his home mobile phone service provider (and its partners). Roaming service automatically allows the mobile phone owner to be reached by calls made from (or routed through) his home country, and also allows the mobile phone owner to make calls out of the host country to anywhere in the world through the home mobile service provider. Roaming service includes features such as auto-detection of the traveller's location and the nearest local host phone service partner of the home mobile service provider in order to bridge the communication (e.g. auto-roaming etc.). Unfortunately, mobile phone roaming service is very expensive.

Any call through a roaming service in a foreign country reaches the home mobile service provider of the phone before it is re-directed to the destination. For example, if a traveller to the UK makes a call in the UK through a Singapore mobile phone to a destination which is also in the UK, the connection has to be directed from UK to Singapore before it is re-directed to the UK again. An expensive round the world connection is made.

Furthermore, in some countries, even calls made to destinations within a same country using local phones are made through roaming connections. For example, inter-states mobile phone calls within the USA or India may be charged roaming service rates.

FIG. 2 illustrates an example of a known telephone system. A traveller brings his phone 24 which is registered for use in country A 21. By sending a roaming SMS 22 when the traveller is in country B 25, the traveller indicates to the owner the destination phone 26 who receives the SMS, who is in country A 21, to call him by way of an inbound call 23 through the traveller's roaming connection. In this manner, the traveller avoids an outward roaming call from country B 25.

Referring now to FIG. 3 which shows another prior art known as SMS Callback, a resident (not shown) in country B 35 has bought a phone 34 which is registered for use in country B 35. The resident then also registers the phone with a gateway provider, not shown, of the embodiment which provides cheap SMS callback connection. The gateway provider may or may not be installed in the same country as a gateway 37 it provides, the dotted line depicting the possibility of the gateway 37 being linked to a gateway provider in another country A 31. The resident sends 32 an SMS from country B 35 to a gateway 37 of the gateway provider using his mobile 34. The gateway 37 then performs a callback 33 to the mobile phone 34 of the resident, as well as a call out 38 from the gateway to a destination phone 36 in the same country B 35. The two calls 33, 38 are patched 39 at the gateway 37 when the connections are successful and the two phones 34, 36 are thus connected for conversation. In a variation of this prior art, the destination phone 36 may be of another country, or registered in a different country from the country in which the resident's mobile phone 34 is registered. The gateway 37, like the gateway provider itself, may either be situated in a different country, e.g. country A 31, or in the resident's country B 35. The calls placed by the gateway may therefore either be long distance calls from country A 31 or local calls in country B 35.

The prior art is limited in that it does not allow a traveller who frequently travels to different countries to avail himself of the advantage of a callback connection through local operators in every foreign country. The task of buying phones (or SIM cards) registered for local operation in different countries and to record the different numbers of the phones will be daunting even to the most well organised traveller. In addition, some countries have telecommunication monopolies which prevent the use of SMS callback initiated from servers or gateway stationed within the country.

SUMMARY OF THE INVENTION

The invention aims to provide a method of bypassing roaming service, and its restrictions, for users of mobile phones.

In general terms, the invention proposes a service whereby a traveller rents (or to buys) and carries from his home country a mobile phone capable of generating a message to an SMS Callback service provider, which will initiate a connection between the traveller's rented phone and a destination phone line. The rented mobile phone is associated with a telephone network covering the host country, and is also registered with the SMS Callback service provider. Alternatively, the user may rent the phone when he arrives at the host country. Alternatively, a traveller who carries his own mobile phone from his home country can rent or buy a SIM card which is registered or meant for use in the host country, and which is also registered with the SMS Callback service provider for SMS Callback. Furthermore, the phone provided by service may be pre-registered by the service provider to the SMS callback service of this invention. The phone may also be configured such that the traveller to whom the phone is provided is prevented from re-registering the phone with another service provider of SMS callback. The phone may also be configured such that the traveller to whom the phone is provided is prevented from registering the phone with any service provider of SMS callback, the act of registering being limited to the service provider of this invention.

An advantage of the embodiments of the invention is that the traveller may enjoy cheaper international call rates by bypassing roaming connections, since the rented phone is one which is registered or meant for use in the host country. The embodiment of the invention even allows bypassing telecommunication companies prohibiting SMS callback.

A first aspect of the invention is a telecommunications system comprising a messaging-enabled communications device configured for a roaming-free connection to a mobile telephone services provider, a distributor, the distributor providing the communications device to a user, and a gateway, the gateway being for placing a telephone call to a destination telephone having a telephone number indicated by a message received from the mobile communications device and also for placing a telephone call to the user though the service provider to patch the customer to the destination telephone without incurring roaming charges, wherein the communication device is registered with the gateway before it is provided to the user.

A second aspect of the invention is a telecommunications method comprising the steps of providing a messaging-enabled communications device configured for a roaming-free connection to a telephone services provider, providing a distributor, the distributor providing the mobile communications device to a user; and providing a gateway, the gateway placing a telephone call through the gateway to a destination telephone having a telephone number indicated by a message received from the mobile communications device and also placing a telephone call through the telephone services provider to the user to patch the customer to the destination telephone without incurring roaming charges, wherein the communication device is registered with the gateway before it is provided to the user.

A third aspect of the invention is a messaging-enabled enabled phone arranged to generate a menu of options, the menu comprising destination telephone numbers, wherein selection of one or more of the destination numbers causes the phone to generate a message to a service provider of SMS Callback, the message containing indications of at least one of the destination numbers, the message causing the service provider to place call(s) to at least one destination numbers and also to place a call to the sender of the message, and patching the calls when they are connected.

A fourth aspect of the invention is a messaging-enabled enabled phone having a button wherein a message is sent to a service provider providing SMS Callback when pressed.

BRIEF DESCRIPTION OF THE FIGURES

Embodiments of the invention will now described, by way of example, with reference to the accompanying drawings, in which.

DETAILED DESCRIPTION OF THE PREFERRED EMBODIMENT

Figure 1:
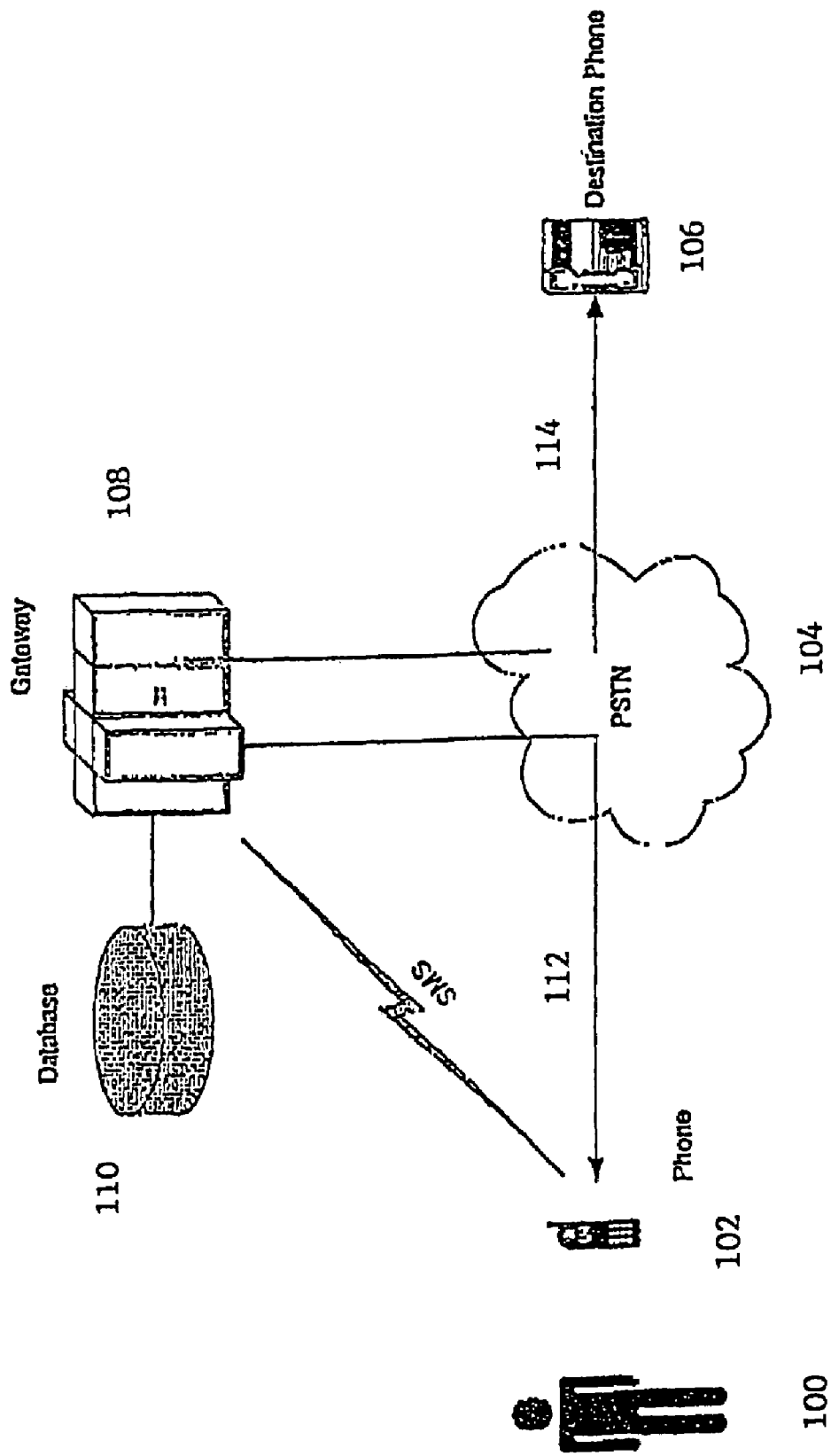
FIG. 1 is a diagram showing an embodiment of the invention.
Figure 2:
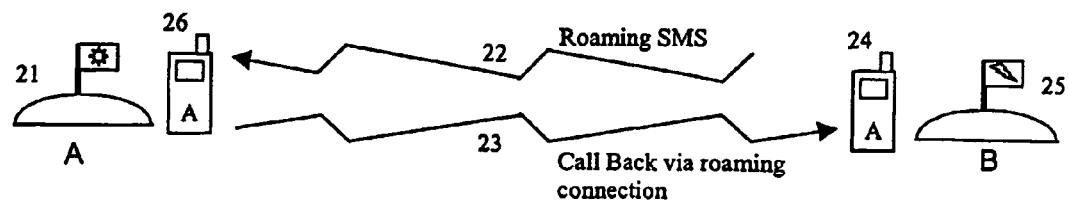
FIG. 2 shows a common mode of SMS initiated callback in the prior art.
Figure 3:
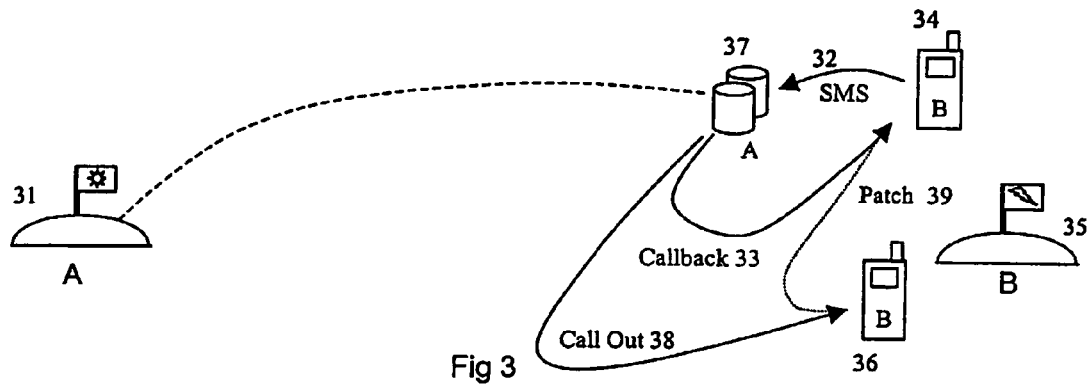
FIG. 3 shows another callback service in the prior art.

Referring now to FIG. 1, a traveller 100 rents a mobile phone 102 which is meant for use a country which he intends to visit (a "host country"). As an example, a Singaporean traveller who is going to UK from Singapore rents a UK mobile phone from a service provider of this embodiment, which provide SMS Callback services, while he is still in Singapore. Alternatively, the traveller may rent a UK mobile phone registered with the service provider of this embodiment only after arriving in UK. The phone may be registered with the service provider before it is provided to the user.

To make a call connecting to Singapore or elsewhere after the traveller has arrived in the UK, the traveller sends an SMS from the rented phone to a gateway 108 of the service provider, specifying a destination 106 phone line.

The gateway 108 is able to recognise the traveller 100 sending the SMS by a caller ID of the mobile phone, a registered user ID sent along with the SMS, a password or by some other identification/registration means. In other words, the phone can be identified and authenticated when an SMS is sent from the phone to the gateway of the service provider. The mechanisms by which the gateway provider is able to identify the rented phone are well known in the art, such as using a database 110 which contain the information on the registered user and which is connected to the gateway.

The gateway 108 receives the SMS message through either a GSM modem or through a data-link to an SMS centre, or any other alternative methods. Subsequently, the gateway 108 places calls to the destination 106 number contained in the SMS and also to the traveller's rented mobile phone 102 and, on connection of both calls, the gateway patches them 112, 114 for a tele-conversation (the calls are made through Public Switched Telephone Networks, PSTN 104, as is conventional in the art). Therefore, the traveller receives a call to his UK mobile from the gateway of the service provider of the SMS Callback service. No roaming connection is required for a tele-conversation, as no Singapore registered phone is used in the UK. The service provider may either have a gateway in the UK or outside.

If the gateway is situated in the host country, UK in this embodiment, the SMS sent to the service provider to initiate a callback is a local SMS. If the gateway is situated outside the host country, the SMS may be received by the service provider though a roaming SMS.

The gateway may include or is connected to a system having an Internet connection, such as voice over IP, in order to receive the messages and initiates the calls.

Figure 4:
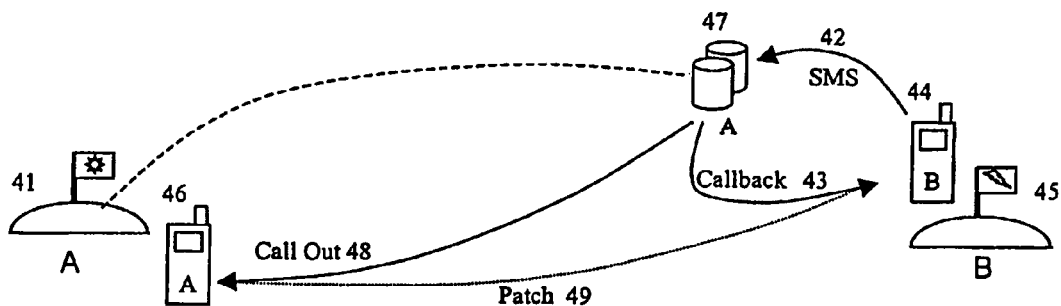
FIG. 4 is another diagram showing the embodiment of FIG. 1.

Referring now to FIG. 4 for a further illustration of the embodiment, a traveller to the UK (country B 45), sends an SMS 42 to a gateway 47, or one of many 10 gateways, of the service provider while in the UK, using the UK mobile phone 44 rented from the service provider. The gateway provider may or may not be installed in the same country as the gateway 47, the dotted line depicting the possibility of gateway 47 being linked to a gateway provider in another country A 41. The SMS contains the number of a destination phone line (e.g. "1234567"). When the gateway receives the SMS, the service provider will initiate calls to the traveller's rented UK mobile phone and to the destination number "1234567", i.e. the gateway then initiates a callback 43 to the traveller's mobile 44 (or any phone line he indicates on his SMS) and also calls 48 the destination phone line 46 (which is in another country A 41 in this example). When the two calls are successful, the gateway provider patches the two calls 49 and tele-conversation can ensue without roaming service. The destination phone line may, despite the illustration in FIG. 4, also be in the same area in which the traveller sends the SMS Callback message.

The traveller's mobile 44, which is registered for use in the country of travel 45, is also registered with the service provider of this embodiment, so that the caller may be identified and the provider may provide the service.

In a variation of the embodiment, if the traveller wants to use a wired phone, such as a phone in a public telephone booth, to receive the callback in order to talk to another phone may send an SMS having the telephone numbers of the two lines, e.g. the number of the telephone in the telephone booth and the telephone number of the other line: "+44-12345678, +65-0987654". The callback service will be activated to call both the telephone booth's phone and the other line. The traveller can then pick up the callback in the telephone booth and the gateway will patch both lines if their connections are both successful.

In order to provide the callback service if the gateway is stationed outside the host country, talk time provided by telecommunication companies between the country where the gateway is installed and the host country may be bought by the service provider in bulk, resulting in a dramatic reduction in cost when the gateway places calls to the traveller.

If the gateway is stationed outside the host country, telecommunication companies in the host country will not be able to detect if the call placed by the gateway is initiated from an SMS Callback service provider. Therefore, any effort by such companies which prevents SMS Callback services may be bypassed with minimal and existing infrastructure.

In a further variation of the embodiment, the sender sends an SMS having more than one destination 106 number to the gateway 108. In this way, the gateway 108 will provide a connection between multiple parties in a conference call. In this case, the SMS format might be:

"<host number>,<destination number 1>,<destination number 2>".

The host number may either be the traveller's mobile from which the SMS is sent or, if he does not want to use the mobile phone for the connection, the line which he expects to be called back at (for example, a telephone in the telephone booth). In a variation of the embodiment, the number of the traveller's rented mobile may not be included in the callback SMS, as the gateway may be able to identify the mobile without the message having to contain the mobile's number.

In another variation of the embodiment, the traveller rents an SIM card from the service provider instead of a mobile phone, the SIM card being one which is of the host country, e.g. UK SIM card to be used in the UK, and is also registered with the service provider of the SMS Callback services. In this embodiment, the gateway is configured to recognise the SMS as having been sent from the rented SIM card, which is installed in any mobile phone the traveller uses to send the SMS. The ways and configurations by which the service provider is able to identify and authenticate the SIM card are well known in the art.

In a further variation of the above embodiments, calls made to the traveller's own mobile phone, i.e. not the rented phone of this embodiment but the one he owns in the home country, is routed to the traveller through a gateway of the service provider. This may be achieved by associating the rented mobile phone to the traveller's original phone number at the service provider's database, and by enabling a diversion of incoming calls to the traveller's own mobile to the gateway. In this way, incoming calls to the traveller's own mobile phone may be connected to the rented phone without roaming connection.

Although the embodiments described so far use a foreign country, i.e. the UK, as an example of roaming call destinations, the embodiments are to be taken as applicable to any long distance or toll calls, even inter-state calls, which would normally require roaming service to connect the calling parties.

In a further embodiment, a mobile phone that is registered with the service provider may be custom made to have an SMS callback button, for example a button named "SMS2CALL". The button may be in addition to the Call and Hang-Up buttons already found in mobile phones, or may replace the Call button if the mobile is only to be used for the SMS Callback service of this embodiment.

The button may be associated with a menu in the phone. The menu may be a selection of destination phone numbers, and on selection of any of the numbers, generates and sends an SMS to the gateway for the callback connection. Similar to an address menu by which a mobile user may select a phone number to call, such a customised menu relieves the traveller from having to painfully key in each destination number each time he uses SMS callback, or from having to remember the gateway's number.

In a variation of the embodiment, the "SMS2CALL" button may initiate a normal message interface which allows keying in of numbers/text. However, after the message (i.e. destination phone numbers) is typed and the 'send' button pressed, instead of a menu of destination numbers appearing for the traveller to select, the message will be directed to the gateway of the service provider.

The callback message typed by the traveller may be destination numbers or names of people he want to contact, in which case the mobile is able to match names with numbers.

Alternatively, voice recognition selection may be used for the identification of the destination numbers.

In a further embodiment, a custom made mobile for the SMS Callback of this invention may have a built in function to detect and select a gateway from several gateways provided by the service provider to send the message to. The selection may be based on factors of location, convenience or availability (such as the density of message traffic). Furthermore, using the 'SMS2CALL' button/menu/message may mask the gateway's address or number from the user. This increases security as the gateway's number is hidden from hackers.

According to the embodiments described above, the service provider can now lease out SMS callback phone lines through travel agents and travellers can carry with them from the home country mobile phones which provide a cheap callback connection between the host country and any destination. The travellers may be charged for both the rental of the phones and the usage of the phone lines.

The service provider of this embodiment may be the one directly renting out the phone. Alternatively, the phone may be rented to the traveller through a travel agency outlet, other retail outlets or a representative of the service provider in the host country.

In a further embodiment, the user does not necessarily send an SMS to the service provider. Instead of, or in addition to the SMS message, the message sent to the server is a normal phone call. The user may dial the destination number via the keypad on the phone, as in conventional usage of phones, but the telephone is programmed to call the server instead of the destination number. A fake ring-tone is optionally played so that the user is made to feel that he is dialling the destination line in a conventional way, and is prevented from guessing the mechanism of this embodiment. When the server receives the incoming call from the phone, it hangs up without picking up the line so that there is no charge incurred by the user calling the server. The server then calls the user's phone. The user's phone answers the call, and transfers the destination number dialled by the user to the server (at this time, the user is still preferably hearing the ring-tone). The number may be transferred from the user's phone to the server in a message of text or as a DTMF (Dual-Tone Multi-Frequency) tone. Subsequently, the server calls the destination number and, when the call is answered, connects the two lines. In this embodiment, the steps of using a phone may be, from the user's point of view, the same as in using a conventional phone, and the mechanism of connecting the lines is hidden from the user.

Although the embodiments describe using an SMS as the means of initiating the gateway to connect the identified phone lines, one skilled in the art would is know that equivalent forms of communication to the service provider are possible (such as MMS).

Although the embodiments described a mobile phone, it is to be understood that the device for initiating the connections may be any messaging enabled device, such as ICQ via the Internet.

Although the embodiments describe a custom made button for SMS Callback, it is to be understood that the button may be any form of user interactive device, such as a touch pad.

Although the embodiments describe a mobile for SMS Callback which bypasses roaming services and which is rented by a traveller, it is to be understood that the mobile may be bought instead of rented from the service provider.

The invention claimed is:

1. A telecommunications system comprising:
   a messaging-enabled communications device configured for a roaming-free connection to a mobile telephone services provider;
   a distributor, the distributor providing the communications device to a user; and
   a gateway, the gateway being for placing a telephone call to a destination telephone having a telephone number indicated by a message received from the communications device and also for placing a telephone call to the user though the service provider to patch the user to the destination telephone without incurring roaming charges; wherein
   the communication device is registered with the gateway before it is provided to the user and wherein
   the communication device activates a fake ring-tone when the message is being received by the gateway so that the user is made to feel that the destination telephone is being dialed in a conventional way; and
   wherein the communication device activates the fake ring-tone during a sequence in which the gateway hangs up on the communication device, calls back the communication device and then places the call to the destination telephone.

2. The system of claim 1, wherein the message is an SMS.

3. The system of claim 1, wherein the message is an MMS.

4. The system of claim 1, wherein the mobile communications device is a mobile telephone.

5. The system of claim 1, wherein mobile communications device is a SIM card.

6. The system of claim 1, wherein the user receives the telephone call at the mobile communications device.

7. The system of claim 1, wherein the user receives the telephone call at a telephone having a telephone number indicated by the message.

8. The system of claim 1, wherein the mobile communications device is provided to the user by renting it to the user.

9. The system of claim 1, wherein the mobile communications device is provided to the user by selling it to the user.

10. The system of claim 1, wherein the distributor is a retail outlet.

11. The system of claim 1, wherein the distributor provides a selection of mobile communications devices configured for roaming-free connections to different mobile telephone services providers.

12. The system of claim 1, further comprising:
    a database containing user identification information and billing information of the user;
    an identification system for obtaining the user identification information from the message;
    a data processing system for matching the user identification information obtained from the message with the user identification information in the database to identify the user.

13. The system of claim 12, wherein the user identification information and billing information of the user is entered into the database based on information obtained upon the user registering with the distributor.

14. The system of claim 1, wherein the user may enable a diversion of calls from another communication device to the gateway, whereby the calls may be connected to the messaging-enabled communications device.

15. The system of claim 1, wherein the distributor is located outside the service area of the mobile telephone services provider.

16. The system of claim 1, wherein the gateway is located outside the service area of the mobile telephone services provider.

17. The system of claim 1, wherein the gateway is arranged, upon receiving a first phone call from the communication device, to place a second phone call to the device and thereby initiate the sending of the message as part of the second phone call.

18. A telecommunications method comprising the steps of:
    providing a messaging-enabled communications device configured for a roaming-free connection to a telephone services provider;
    providing a distributor, the distributor providing the mobile communications device to a user;
    providing a gateway, the gateway placing a telephone call through the gateway to a destination telephone having a telephone number indicated by a message received from the communications device and also placing a telephone call through the telephone services provider to the user to patch the customer to the destination telephone without incurring roaming charges; wherein the messaging-enabled communication device is registered with the gateway before it is provided to the user; and
    activating a fake ring-tone in the messaging-enabled communication device when the gateway is receiving the message so that the user is made to feel that the destination telephone is being dialed in a conventional way; and
    wherein the messaging-enabled communication device activates the fake ring-tone during a sequence in which the gateway hangs up on the messaging-enabled communication device, calls back the messaging-enabled communication device and then places the call to the destination telephone.

19. The method of claim 18, wherein the message is an SMS.

20. The method of claim 18, wherein the message is an MMS.

21. The method of claim 18, wherein the mobile communications device is a mobile telephone.

22. The method of claim 18, wherein the mobile communications device is a SIM card.

23. The method of claim 18, wherein the user receives the telephone call at the mobile communications device.

24. The method of claim 18, wherein the user receives the telephone call at a telephone having a telephone number indicated by the message.

25. The method of claim 18, wherein the mobile communications device is provided to the user by renting it to the user.

26. The method of claim 18, wherein the mobile communications device is provided to the user by selling it to the user.

27. The method of claim 18, wherein the distributor is a retail outlet.

28. The method of claim 18, wherein the distributor provides a selection of mobile communications devices configured for roaming-free connections to different mobile telephone services providers.

29. The method of claim 18, further comprising:
    a database containing user identification information and billing information of the user;
    an identification system for obtaining the user identification information from the message;
    a data processing system for matching the user identification information obtained from the message with the user identification information in the database to identify the user.

30. The method of claim 29, wherein the user identification information and billing information of the user is entered into the database based on information obtained upon the user registering with the distributor.

31. The method of claim 18, wherein the distributor is located outside the service area of the mobile telephone services provider.

32. The method of claim 18, wherein the gateway is located outside the service area of the mobile telephone services provider.

33. The method of claim 18, wherein the user may enable a diversion of calls from another communication device to the gateway, whereby the calls may be connected to the messaging-enabled communications device.

34. The method of claim 18, further comprising the steps of the gateway receiving a first phone call from the communication device; the gateway hanging up the phone call; and the gateway placing a second phone call to the device, thereby initiating the sending of the message as part of the second phone call.

35. A messaging-enabled enabled phone arranged to generate a menu of options, the menu comprising destination telephone numbers; wherein
selection of one or more of the destination numbers causing the phone to generate a message to a service provider of SMS Callback;
the message containing indications of the at least one of the destination numbers; the message causing the service provider to place call(s) to the at least one destination number and also to place a call to the sender of the message, and patching the calls when they are connected;
the messaging-enabled phone is registered with a gateway before it is provided to a user; and
wherein the phone activates a fake ring-tone when the message is being received by the gateway so that the user is made to feel that the destination telephone is being dialed in a conventional way; and
wherein the messaging-enabled phone activates the fake ring-tone during a sequence in which the gateway hangs up on messaging-enabled phone, calls back the messaging-enabled phone and then places the call to the destination telephone.

36. A messaging-enabled enabled phone as claimed in claim 35, which is called up by a button in the messaging-enabled phone.

37. A messaging-enabled enabled phone as claimed in claim 35, wherein the message is SMS.

38. A messaging-enabled enabled phone as claimed in claim 35, wherein the message is MMS.

39. A messaging-enabled enabled phone as claimed in claim 35, wherein the message masks the gateway of the service provider.

* * * * *